United States Patent
Hoshino et al.

(10) Patent No.: US 7,443,636 B2
(45) Date of Patent: Oct. 28, 2008

(54) MAGNETIC HEAD HAVING LAYERED FILM WITH TILTED CRYSTALLINE GRAIN STRUCTURE

(75) Inventors: Katsumi Hoshino, Kanagawa (JP); Hiroyuki Hoshiya, Kanagawa (JP); Kenichi Meguro, Kanagawa (JP); Yasuyuki Okada, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 356 days.

(21) Appl. No.: 11/271,457

(22) Filed: Nov. 10, 2005

(65) Prior Publication Data

US 2006/0098356 A1      May 11, 2006

(30) Foreign Application Priority Data

Nov. 10, 2004    (JP)    ............... 2004-326870

(51) Int. Cl.
*G11B 5/33*    (2006.01)
(52) U.S. Cl. ................. 360/324.1; 360/324.2
(58) Field of Classification Search ..... 360/324–324.11
See application file for complete search history.

(56) References Cited

U.S. PATENT DOCUMENTS

| | | | |
|---|---|---|---|
| 5,589,283 A * | 12/1996 | Iwasaki et al. | 428/812 |
| 6,338,899 B1 * | 1/2002 | Fukuzawa et al. | 360/324.12 |
| 6,783,635 B2 * | 8/2004 | Pinarbasi | 204/192.11 |
| 7,061,731 B2 * | 6/2006 | Larson et al. | 360/324.12 |
| 7,220,315 B2 * | 5/2007 | Iijima | 117/95 |
| 7,270,896 B2 * | 9/2007 | Parkin | 428/811.1 |

FOREIGN PATENT DOCUMENTS

| | | |
|---|---|---|
| JP | 05-304026 | 11/1993 |
| JP | 06-012649 | 1/1994 |
| JP | 07-169026 | 7/1995 |
| JP | 2000-215413 | 8/2000 |

* cited by examiner

*Primary Examiner*—A. J. Heinz
(74) *Attorney, Agent, or Firm*—Townsend and Townsend and Crew LLP; Rambod Nader (57) ABSTRACT

Embodiments of the invention implement a construction capable of reconciling high read output with high stability by improving the structures of magnetic films. In one embodiment, an inclined crystal grain structure is applied to a soft magnetic free layer, ferromagnetic pinned layer and so forth, thereby enhancing electron scatter performance of thin magnetic films.

9 Claims, 10 Drawing Sheets scattering area ratio
→ current path = t·tanθ/D

Fig. 1

(PRIOR ART)

MAGNETIC HEAD HAVING LAYERED FILM WITH TILTED CRYSTALLINE GRAIN STRUCTURE

CROSS-REFERENCES TO RELATED APPLICATIONS

This application claims priority from Japanese Patent Application No. JP2004-326870, filed Nov. 10, 2004, the entire disclosure of which is incorporated herein by reference.

BACKGROUND OF THE INVENTION

The present invention relates to a magnetic head mounted in a hard-disk drive and more particularly to a magnetic head for use in a high recording density hard-disk drive.

A magneto-resistive magnetic head is used as a reproducing sensor in a high recording-density magnetic recording technology with a hard-disk serving as the main part thereof, being a part largely affecting the performance of the magnetic recording technology. While the recording density of the hard-disk drive is rapidly increasing, it has been impossible with the use of the conventional technology to implement a hard-disk drive having a sufficiently high recording density, and in particular, to implement a magneto-resistive magnetic head acting on an external magnetic field with a satisfactory sensitivity and sufficient output, at a reproducing part of the device, thereby obtaining sufficiently stable and excellent characteristics, so that it has been difficult to exhibit a function as a recording equipment.

It has recently known that a magnetoresistance of a multilayered film made up of ferromagnetic metal layers deposited one on top of the other with a nonmagnetic metal layer interposed therebetween, the so-called giant magnetoresistance, is large. When a magnetic head makes use of the magnetoresistance, use has thus far been made of the so-called CIP-GMR that is obtained when a current is passed in the in-plane direction of a multilayered film. Further, research has lately been carried out on a perpendicular current type giant magnetoresistance obtained when a current is passed in the direction of thickness of a multilayered film, the so-called CPP-GMR as well.

Examples of current technology are found in JP-A No. 304026/1993 (Patent document 1); JP-A No. 169026/1995 (Patent document 2); and JP-A No. 12649/1994 (Patent document 3).

BRIEF SUMMARY OF THE INVENTION

The present invention relates to a magneto-resistive spin valve sensor, and a magnetic head. A magnetic head using the conventional magneto-resistive sensor has had a problem in that a high output could not be obtained. In particular, a problem with CPP-GMR is that since current flows in the direction of thickness, change in electric resistance, as observed, is small, that is, reproducing output is small, as compared with the case of the conventional CIP-GMR. The respective thicknesses of magnetic films, and an intermediate nonmagnetic film, as constituent elements of the multilayered film, are generally as small as on the order of 2 to 5 nm. In, for example, "J. Appl. Phy.", Vol. No. 91, pp. 8105-8107 (2002), or "J. Appl. Phy.", Vol. No. 92, pp. 2646-2650 (2002), there is shown change in resistance-area product when the thicknesses of the magnetic films are increased, and it is described therein that a relatively high output can be obtained by increasing the respective thicknesses of the magnetic films to a range of 6 to 8 nm. Meanwhile, in the case of the high recording density magnetic recording technology, there is the need for installing the reproducing sensor inside a reproducing gap of a predetermined narrow width, and because the respective thicknesses of the magnetic films cannot be significantly increased with the conventional technology, a scatter probability of electrons passing through the magnetic films is low, so that it is not possible to obtain a high output.

Meanwhile, as shown in, for example, Patent Document 3, there has been known a technology with reference to a magnetic recording medium for enhancing the characteristics of the magnetic recording medium by controlling the structure of thin films. However, it is difficult to apply such structure control as in the case of an example of the recording medium described as above to a magnetic head because there is nothing specific in common between a sensor and the recording medium owing to difference in function therebetween.

The invention is intended to implement a high electron scatter performance of a magnetic head, in particular, a magnetic head using CPP-GMR, thereby reconciling a high read output with stable operation.

With the invention, in order to provide a high-density recording enabled magnetic head, and a hard-disk drive mounting the same, the magnetic head makes use of a spin valve type magneto-resistive multilayered film, that is, a magneto-resistive element having a multilayered construction of a soft magnetic free layer/a nonmagnetic intermediate layer/a ferromagnetic pinned layer/an antiferromagnetic film. In this case, the antiferromagnetic film serves for applying a bias for pinning with exchange interaction to fix in effect magnetization of the ferromagnetic pinned layer, and may be formed in intimate contact with the ferromagnetic pinned layer, or may indirectly bring about such effect through magnetic coupling. Otherwise, instead of the antiferromagnetic film, use may be made of other means for applying the bias, for example, remanent magnetization of a hard magnetic film. Parts of the multilayered construction of the magneto-resistive multilayered film are formed by grazing incidence in order to increase a scatter probability. By so doing, parts of the magneto-resistive multilayered film have a construction wherein crystal grains grow in an inclined direction, in relation to a substrate. Grain boundaries formed in the inclined direction have a function of increasing the scatter probability.

Preferably, the ferromagnetic pinned layer, in particular, of the magneto-resistive multilayered film has this inclined crystal grain structure. The reason for this is that a pinning effect can be more stabilized by causing magnetic shape anisotropy, which is a secondary effect of the inclined crystal grain structure, to coincide with the magnetic direction of the ferromagnetic pinned layer. Similarly, the soft magnetic free layer may have the inclined crystal grain structure. In this case, however, an inclination direction is preferably rendered substantially perpendicular with that in the case of the ferromagnetic pinned layer, and parallel to a magnetic field to be detected. The reason for this is that by causing the magnetic shape anisotropy to coincide with the direction of easy magnetization of the soft magnetic free layer, rotation magnetization is rendered stable. Further, a construction is provided wherein the inclined crystal grain structure according the invention is not used in the nonmagnetic intermediate layer. Since the nonmagnetic intermediate layer is a part acting as go-between for spin scatter between the ferromagnetic pinned layer and the soft magnetic free layer, enhancement in the effect of spin scatter in the nonmagnetic intermediate layer will have rather a negative effect.

The magneto-resistive multilayered film is provided with a pair of electrodes to pass a current therethrough. Preferably, the current is passed particularly in the direction of thickness of the film. As there is a possibility that the effect of spin scatter is affected by the inclined crystal grain structure in the case of passing the current in the in-plane direction of the film, as well, the invention is considered applicable to a sensor for an in-plane current, as well. The invention has pronounced advantageous effects particularly in the case of the CPP-GMR multilayered film.

With the invention, it is possible to locally reinforce the scatter probability of electrons by adoption of the inclined crystal grain structure in the magneto-resistive multilayered film, so that a high magnetoresistance effect and high read output can be implemented. Further, a hard-disk drive using the magneto-resistive multilayered film as a read head is capable of attaining a high recording density, that is, recording with short recording wavelengths, recorded on a recording medium, and narrow widths of respective recording tracks, thereby enabling satisfactory read output to be obtained, and excellent recording to be maintained.

DETAILED DESCRIPTION OF THE INVENTION

Thin films constituting a giant magneto-resistive multilayered film were fabricated as follows by use of a DC magnetron sputtering system. The thin films were fabricated by sequentially depositing the following materials on a ceramic substrate in an atmosphere of argon at 0.2 to 3 mTorr. For sputtering targets, respective targets of tantalum, nickel alloy containing 20 at. % of Fe, copper, CoFe, MnPt, and ruthenium were used. In fabricating the multilayered film, DC power was applied to respective cathodes where the respective targets were disposed to thereby keep plasma created inside the system, and respective layers were sequentially formed by opening and closing shutters disposed at the respective cathodes one by one. The respective cathodes were disposed and fixed so as to be inclined by about 20 degrees against the normal to a substrate, and the substrate is shifted to a position corresponding to the respective cathodes inclined by about 20 degrees, thereby implementing formation of the thin films. The substrate has functions for rotating itself on its axis, and detection of a rotated substrate position, respectively. By the agency of the function for the detection of the rotated substrate position, the respective cathodes were caused to be disposed in a direction of a predetermined inclination against the substrate, thereby forming the inclined crystal grain structure. In forming uninclined thin films, and uninclined portions of multilayers, by the agency of the function for rotating the substrate on its axis, a conventional type uninclined and homogeneous crystal grain structure was similarly formed. Changeover between the inclined crystal grain structure and the homogeneous crystal grain structure can be effected by suitably changing a rotating state of the substrate, so that, for example, the inclined crystal grain structure and the homogeneous crystal grain structure can be alternated by the unit of the layer, or the inclination direction of the inclined crystal grain structure can be changed by the unit of the layer.

At the time of forming a film, a film was provided with uniaxial anisotropy by applying a magnetic field of about 80 Oe, in a direction parallel with the substrate, by use of permanent magnets. The film formed was placed in a magnetic field in a vacuum, and heat treatment at 270° C. was applied thereto for 3 hours, thereby causing an MnPt antiferromagnetic film to undergo phase transition. Elements on the substrate were formed by patterning in a photo resist process step. Thereafter, the substrate was worked on to be formed into a slider, and was mounted in a hard-disk drive.

EMBODIMENT 1

Figure 1:
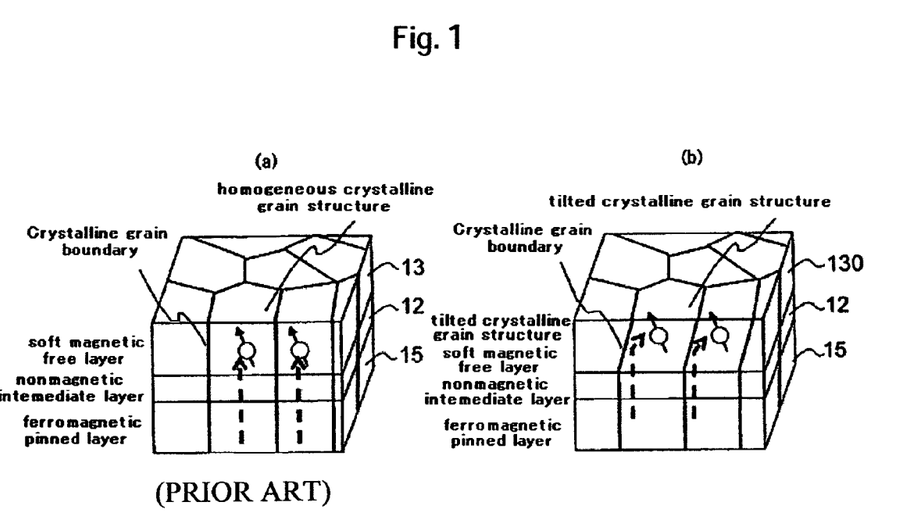
FIG. 1 is a conceptual view showing a multilayered construction of a magneto-resistive head.

FIG. 1 is a conceptual view showing a multilayered construction of a magneto-resistive head, in which FIG. 1A is a cross-sectional view showing a conventional multilayered structure, and FIG. 1B is a cross-sectional view showing a multilayered structure according to an embodiment of the invention. In FIG. 1B, there is shown an example where the inclined crystal grain structure is applied to a soft magnetic free layer.

With the multilayered construction according to a conventional technology, shown in FIG. 1A, the structure of crystal grains is a homogeneous crystal grain structure having no in-plane directional property. The magnetoresistance occurs due to interaction of electron spin information between a soft magnetic free layer 13 and a ferromagnetic pinned layer 15, stacked through the intermediary of a nonmagnetic intermediate layer 12. In the conventional technology, since the crystal grains are parallel with a current passing direction (in the case of an example shown in the figure, in the direction of film thickness), electron scatter performance is low. Accordingly, if the soft magnetic free layer 13 and the ferromagnetic pinned layer 15 are small in thickness, respectively, a sufficient magnetoresistance cannot be obtained. In contrast, in the case of a crystal grain structure according to the invention, shown in FIG. 1B, an inclined crystal grain structure soft magnetic free layer 130 causes electron scatter to be increased. This occurs because inclined grain boundaries form a predetermined angle against a current passing direction (in the case of an example shown in the figure, in the direction of film thickness), resulting in an increase in the ratio of the grain boundaries in a current passing path. Because of such an effect as described, the invention can obtain a high magnetoresistance even with a construction in which the magnetic layers such as the soft magnetic free layer, and so forth are smaller in thickness.

Figure 2:
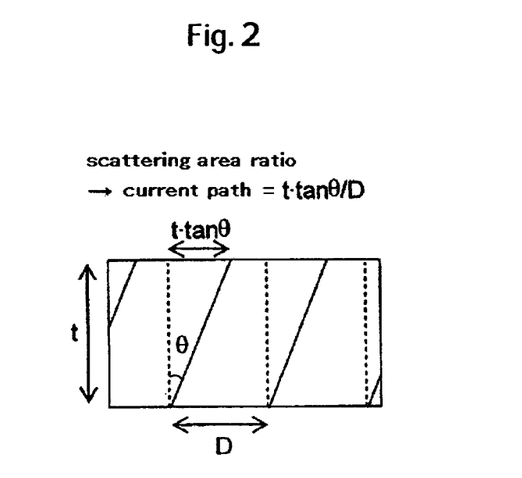
FIG. 2 is view showing a relationship between an inclination angle θ and a scatter area ratio due to a grain boundary.

FIG. 2 shows a relationship between an inclination angle $\theta$ and a scatter area ratio due to the grain boundary. A crystal grain with thickness t, inclined by an inclination angle $\theta$, has an area $t \cdot \tan \theta$ in a current-passing direction. Accordingly, the crystal grain is found to have a scatter area ratio $t \cdot \tan \theta / D$ against a grain size D.

Figure 3:
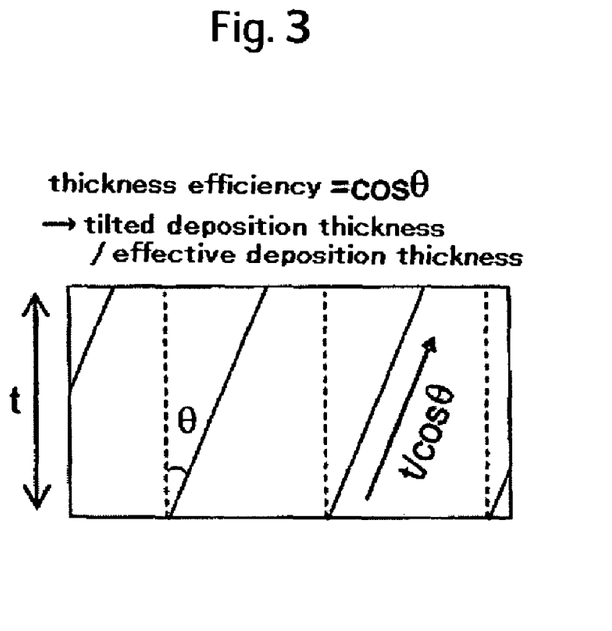
FIG. 3 is view showing a relationship between the inclination angle θ and film thickness efficiency with respect to an inclined crystal grain structure.

Similarly, FIG. 3 shows a relationship between the inclination angle $\theta$ and film thickness efficiency in the formation of an inclined film. In order to form the inclined crystal grain structure, sputtered particles are caused to deposit on at an incident angle substantially identical to the inclination angle. In order to form the inclined crystal grain structure with thickness t, it is necessary to form inclined crystal grains $t/\cos \theta$ in length. Accordingly, the film thickness efficiency becomes $\cos \theta$, so that the greater the inclination angle, the thicker the film is formed from the standpoint of forming the thin film.

Figure 4:
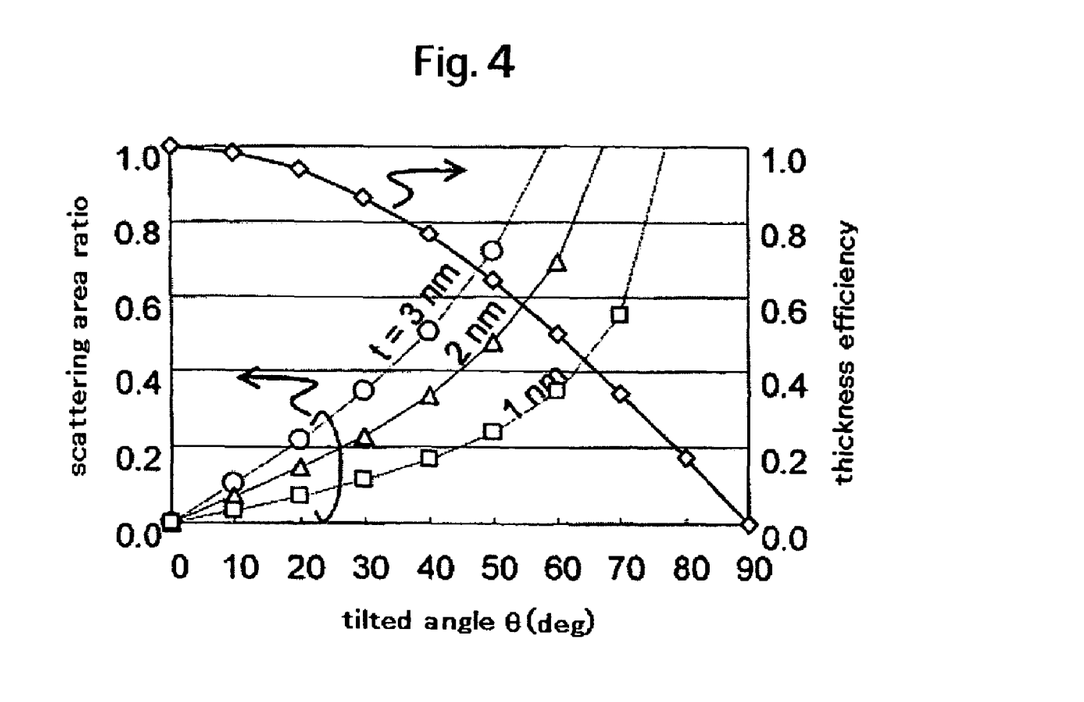
FIG. 4 is view showing a relationship among the inclination angle θ, scatter area ratio of the grain boundary, and film thickness efficiency with respect to the inclined crystal grain structure.

FIG. 4 shows a relationship among the inclination angle $\theta$, scatter area ratio of the grain boundary, and film thickness efficiency. With respect to the thickness t of the magnetic film, 3 nm, 2 nm, and 1 nm were adopted as the respective thicknesses of representative magnetic films. Further, with respect to the grain size D, 5 nm was adopted as the representative grain size on the basis of results of TEM observation of a section.

The scatter area ratio of the grain boundary increases along with an increase in the inclination angle $\theta$, increasing in a relatively linear fashion up to the inclination angle on the order of 50°. Focusing attention on the case of t=3 nm as a common thickness of a magnetic film, the scatter area ratio is found not less than 0.2 at the inclination angle of about 20°, indicating that the effect of the inclined crystal grain structure represents a significant difference in magnetoresistance. With further increase in the inclination angle, the scatter area ratio of the grain boundary further increases. With the inclination angle in excess of 50°, the scatter area ratio of the grain boundary exceeds 1 if t=3 nm, which means that not less than one grain boundary exists within the thickness t, indicating that large scatter performance can be obtained. It is the film thickness efficiency that poses difficulty in attaining a large inclination angle $\theta$. With an increase in the inclination angle $\theta$, the film thickness efficiency undergoes deterioration, and the degree of the deterioration is small when the inclination angle $\theta$ is small. However, if the inclination angle $\theta$ becomes extremely large at not less than about 80°, the film thickness efficiency undergoes deterioration down to 0.2 or less, thereby causing the formation of a thin film to become difficult from an engineering point of view.

Figure 5:
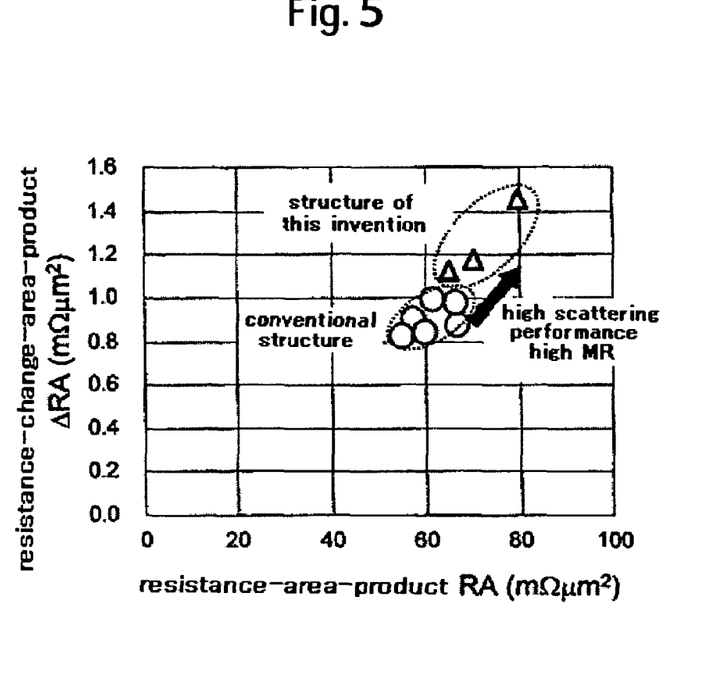
FIG. 5 is view showing resistance-area-product RA and resistance-area-product-change ΔRA with respect to CPP-GMR elements fabricated according to the conventional technology, and according to a magneto-resistive multilayered construction of an embodiment of the invention, respectively.

FIG. 5 shows resistance-area-product RA and resistance-area-product-change $\Delta$RA with respect to CPP-GMR elements fabricated according to the structure of the invention, and the conventional structure, respectively. The multilayered construction was made up of a substrate/lower electrode film (0.1 µm)/underlayer film/MnPt (15 nm)/CoFe (3 nm)/Ru (0.8 nm)/CoFe (3 nm)/Cu (2 nm)/CoFe (3 nm) (the inclined structure)/protective film/upper electrode film, and the inclined structure was formed so as to have an inclination angle of 20°.

With the element of the conventional structure, resistance-area-product-change $\Delta$RA was found in a range of 0.8 to 1.0 m$\Omega$ µm$^2$ at a resistance-area-product RA of 60 m$\Omega$ µm$^2$. In contrast, with the construction of the invention, resistance-area-product-change $\Delta$RA increased to a range of 1.1 to 1.4 m$\Omega$ µm$^2$ at a resistance-area-product RA in a range of 65 to 80 m$\Omega$ µm$^2$. The increase in the resistance-area-product RA and resistance-area-product-change $\Delta$RA demonstrates a high magnetoresistance (MR) due to an increase in the scatter performance of a magnetic film, caused by the inclined crystal grain structure of the invention. Thus, the invention has a primary advantageous effect in that the inclined crystal grain structure causes the scatter performance of electrons to increase, thereby amplifying the magnetoresistance.

Figure 6:
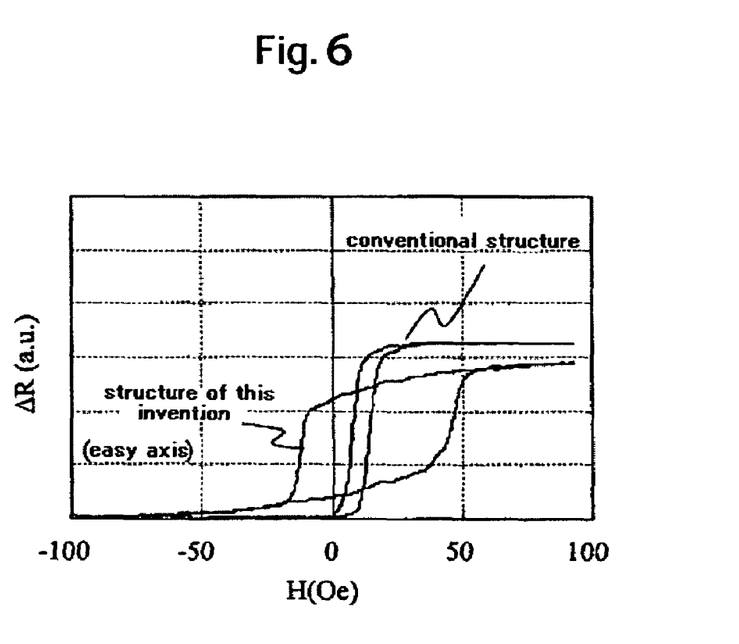
FIG. 6 is view showing magnetoresistive curves of the CPP-GMR elements fabricated according to the conventional technology, and according to the magneto-resistive multilayered construction of an embodiment of the invention, respectively.

FIG. 6 shows magnetoresistive curves similarly with respect to the construction of the invention, and the conventional construction, respectively. While with the multilayered construction of the conventional structure, a magnetization curve with small anisotropy was observed, in the case of a magnetization curve of the soft magnetic free layer having the inclined crystal grain structure according to the embodiment of the invention, a magnetization curve with large magnetic anisotropy, with a coercive force increased to several tens of Oe, was obtained. As is evident from such results as described, the inclined crystal grain structure according to the invention has a secondary advantageous effect in that magnetic anisotropy can be provided in an inclination direction. In the figure, there are shown results produced by aligning the direction of measurement, direction of easy magnetization of the soft magnetic free layer, and direction of the magnetic anisotropy, due to the inclination of the construction according to the invention, with each other, in order to explain the difference in magnetic property between an inclination-forming magnetic film of the structure according to the invention and that of the conventional structure; however, in the case of using the inclined crystal grain structure for the soft magnetic free layer, the soft magnetic free layer is preferably inclined so as to have the magnetic anisotropy in a direction perpendicular to a magnetic field to be detected. The reason for this is that it has the effect of rendering the magnetization process of the soft magnetic free layer to be in the state of rotation magnetization by causing the magnetic field to be detected to be perpendicular to the anisotropy due to the inclined crystal grain structure at right angles, thereby obtaining a desirable effect as a magnetic head having a more linear output.

Figure 7:
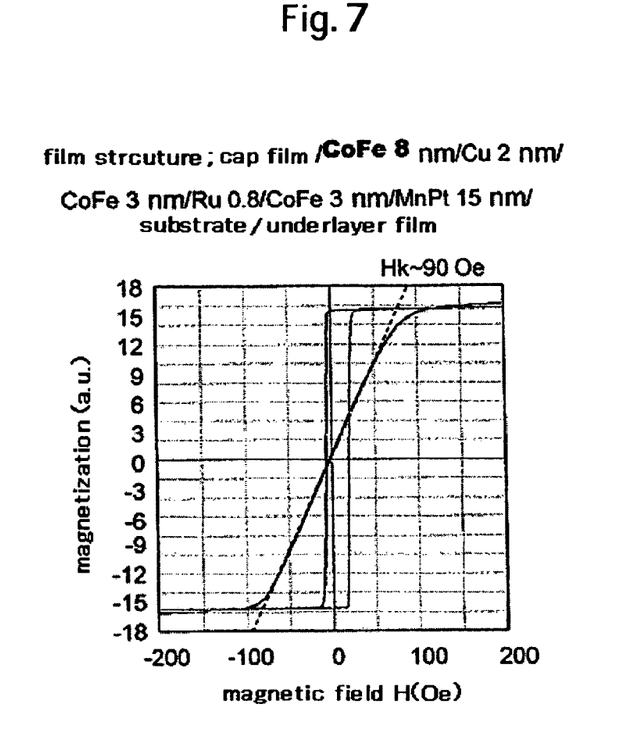
FIG. 7 is view showing magnetization curves of the magneto-resistive multilayered construction wherein the inclined crystal grain structure is adopted in a soft magnetic free layer.

A similar example is shown in FIG. 7 to explain the above in details. FIG. 7 shows the magnetization curves of the soft magnetic free layer when the soft magnetic free layer has the inclined crystal grain structure. In the figure, what appear to be in a square shape represent magnetization curves in the direction of easy magnetization, and linear magnetization curves represent magnetization curves in the direction of hard magnetization. In this case, the direction of easy magnetization was a direction perpendicular to a direction in which the crystal grains were caused to incline within the surface of the film. It is evident from the figure that there were obtained the magnetization curves at a ratio of one to the other, in an excellent square shape, exhibiting a coercive force on the order of 20 Oe, equivalent to that shown in FIG. 6. Further, in the figure, there is obtained the magnetization curve in the direction of hard magnetization, well overlying a straight line indicated by a dotted line. On the basis of an intersection point between the dotted line and saturation magnetization values, an anisotropic magnetic field HK is found at about 90 Oe. It is evident from those magnetization curves that the soft magnetic free layer having the inclined crystal grain structure is provided with an excellent uniaxial anisotropy. Further, the magnitude of the anisotropic magnetic field is several times as large as that of an anisotropic magnetic field (from 20 to 30 Oe) of a commonly known similar material. This is regarded as attributable to the shape anisotropy of the magnetic film, due to the inclined crystal grain structure.

Control of anisotropy by use of such an inclined structure as described is based on the same principle as that for the technologies described in Patent Document 1 concerning the soft magnetic free layer, Patent Document 3 concerning the magnetic recording medium, and so forth, respectively. More specifically, it is anisotropy based on the shape anisotropy due to the inclined crystal grain structure, and a plurality of advantageous points as compared with the case of induced magnetic anisotropy used in the conventional magnetic head technology can be added as the secondary advantageous effect of the invention. Firstly, with the invention, it is possible to control magnitude of the anisotropy, in particular, so as to be larger than, or smaller than the intrinsic induced magnetic anisotropy of a material by varying an inclination angle. Secondly, in contrast with the induced magnetic anisotropy that undergoes a change in direction and magnitude as a result of heat treatment, and so forth, particularly, in the case of a thin film, the anisotropy due to the inclined crystal grain structure according to the invention, based on the shape anisotropy, is thermally stable.

Figure 8:
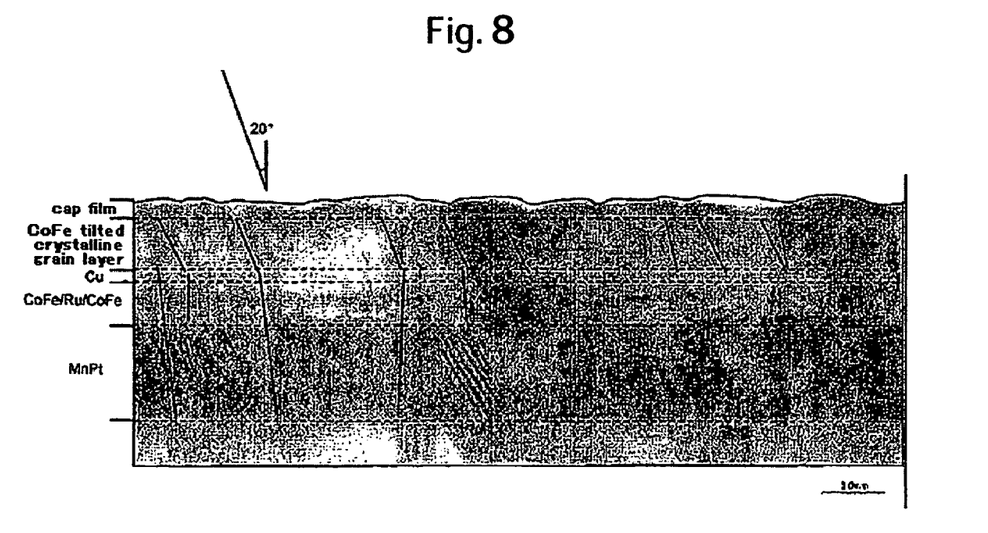
FIG. 8 is an image of a cross-section of a film with the inclined crystal grain structure adopted in the soft magnetic free layer, taken by a transmission electron microscope (TEM).

FIG. 8 is an image of a cross-section of a film with the inclined crystal grain structure adopted in the soft magnetic free layer, shown in FIG. 7, taken by a transmission electron microscope (TEM). While an MnPt antiferromagnetic film, and a CoFe/Ru/CoFe pinned layer each having grain boundaries substantially perpendicular to a film surface can be observed although respective angles of the grain boundaries have variation to some extent, it is evident that the soft magnetic free layer has a structure with grain boundaries inclined toward the left. The respective grain boundaries of the soft magnetic free layer has an inclination angle of about 20°, which coincided with the incident angle 20° of the sputtered particles in the thin-film-forming system that produced the inclined crystal grain structure.

EMBODIMENT 2

Figure 9:
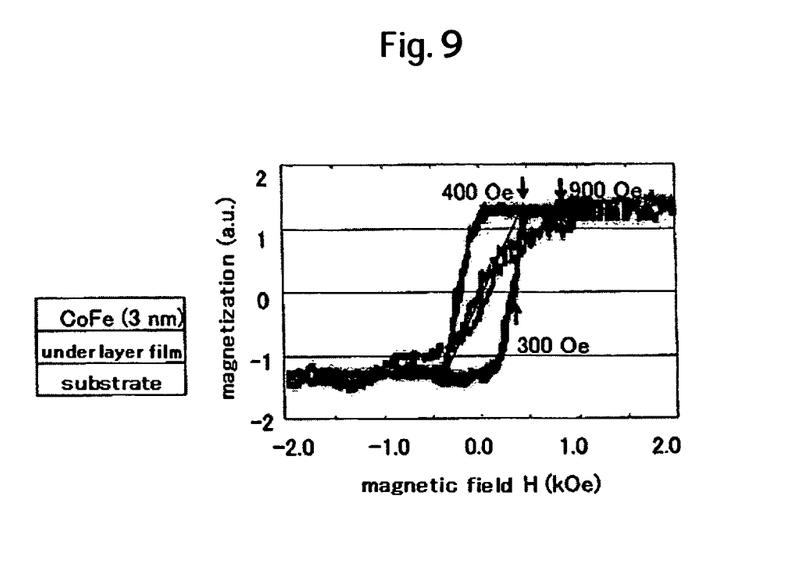
FIG. 9 is view showing magnetization curves of a magnetic film adopting the inclined crystal grain structure.

FIG. 9 is a view showing another characteristic of the inclined crystal grain structure of the invention by way of example. In FIG. 9, there are shown magnetization curves of a CoFe film formed with an inclination angle at 80°. The magnetization curves in the direction of easy magnetization, and the direction of hard magnetization (inclination directions), respectively, are shown. In this case, the direction of easy magnetization was a direction perpendicular to a direction in which the crystal grains were caused to incline within the surface of the film. With the magnetization curves in the direction of easy magnetization, a large coercive force of 300 Oe and an excellent square shape can be observed. Similarly, with the magnetization curves in the direction of hard magnetization, a magnetic field for saturation, at 900 Oe, was obtained, and further, a magnetic field when the magnetization curve in the vicinity of a magnetic field at zero was extended up to a saturation value by extrapolation was found at about 400 Oe. Those values are larger by more than one order of magnitude in comparison with the coercive force and the anisotropic magnetic field value of a CoFe film formed by the conventional technology, which are in a range of 10 to 30 Oe. Thus, the magnetic head according to the invention, adopting the inclined crystal grain structure, is capable of implementing and controlling a large magnetic anisotropy, for example, magnetic anisotropy larger than the normal by more than one order of magnitude, such as 300 to 900 Oe.

Figure 10:
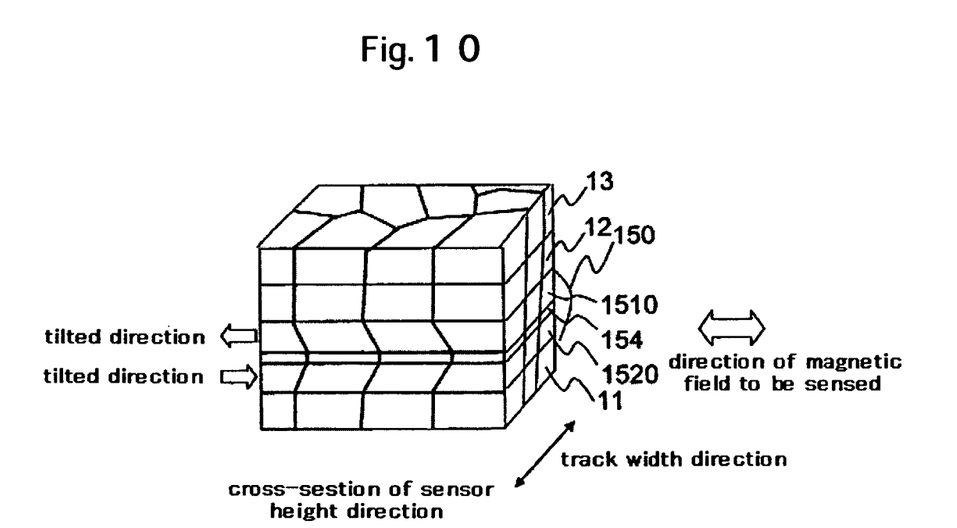
FIG. 10 is view showing an example of the magneto-resistive multilayered construction wherein the inclined crystal grain structure is adopted in respective ferromagnetic pinned layers.

In FIG. 10, there is shown an example of a magnetoresistive multilayered film wherein ferromagnetic pinned layers each have the inclined crystal grain structure. In the case of this construction example, an inclined crystal grain structure ferromagnetic pinned layer 150 was formed to have a synthetic ferromagnetic structure wherein respective magnetizations of the ferromagnetic pinned layers stacked with an antiparallel coupling layer 154 interposed therebetween are arranged in antiparallel with each other. A first inclined crystal grain structure ferromagnetic pinned layer 1510 and a second inclined crystal grain structure ferromagnetic pinned layer 1520 can attain a stronger fixed state against a magnetic field to be detected by the agency of shape anisotropy occurring due to the inclined crystal grain structure, in addition to a pinning bias due to a magnetic field produced by coupling with exchange interaction by virtue of an antiferromagnetic film 11.

Thus, if the inclined crystal grain structure according to the invention is adopted in the ferromagnetic pinned layers, a magnetic head exhibiting more excellent stability can be implemented. Further, if sufficiently large shape anisotropy is applied as an application example, it is possible to retain a state in which magnetization of the inclined crystal grain structure ferromagnetic pinned layer 150 is in effect fixed even by omitting the antiferromagnetic film 11.

In FIG. 10, the respective inclination directions of the first inclined crystal grain structure ferromagnetic pinned layer 1510 and the second inclined crystal grain structure ferromagnetic pinned layer 1520 are oriented so as to oppose each other, however, even if those are oriented in the same direction, it will not depart from the spirit and scope of the invention. This is so because it represents a uniaxial phenomenon wherein even if the respective inclination directions are antiparallel with each other, scatter areas of respective electrons thereof are equivalent to each other, and magnetic shape anisotropies as well are equivalent to each other upon rotation through 180°. As the technique of lowering thickness distribution occurring when forming thin films so as to be inclined to gain a merit from an industrial point of view, there is a case where it becomes effective to change over the inclination directions of the thin films inclined so as to be antiparallel with each other halfway through, so that changeover may be suitably made between parallel direction and antiparallel direction inside the multilayered construction having the inclined crystal grain structure.

EMBODIMENT 3

Figure 11:
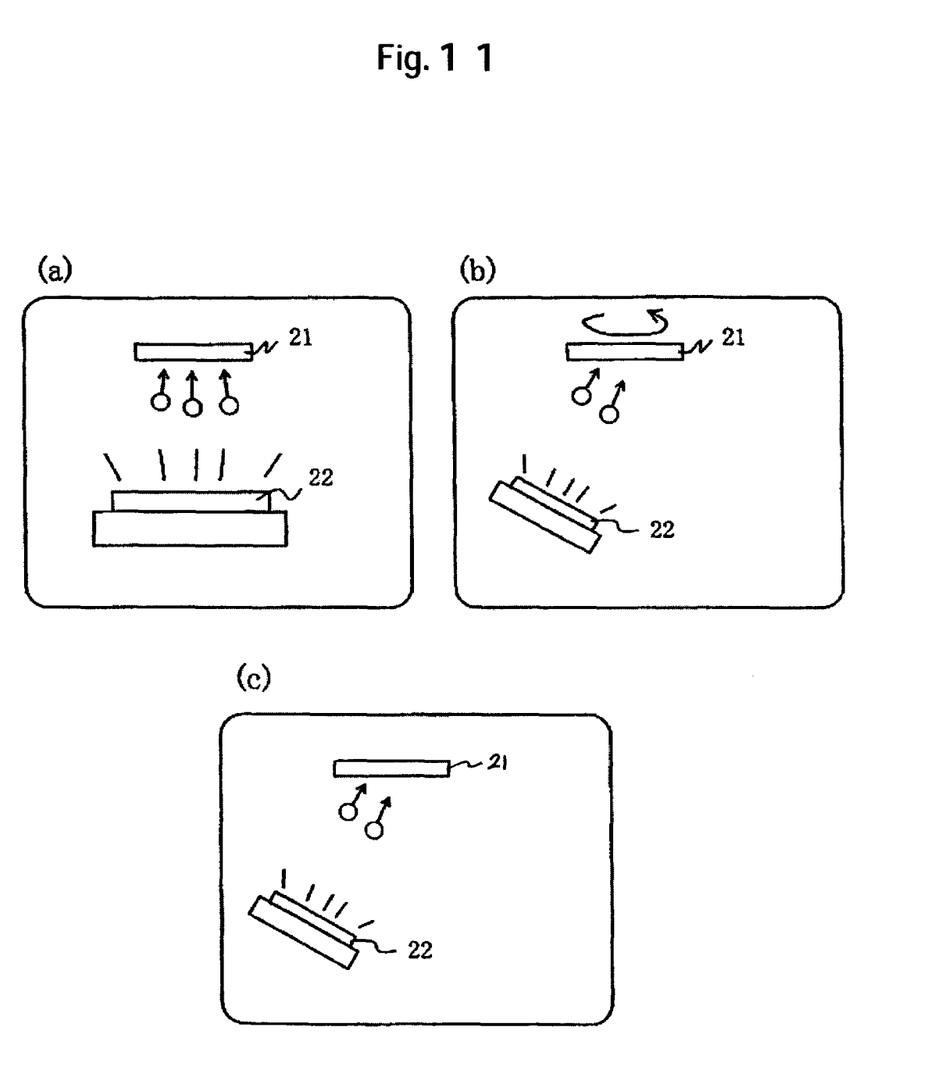
FIG. 11 is a conceptual view showing a method of forming the inclined crystal grain structure.

FIG. 11C is a conceptual view showing a method of forming thin films of the inclined crystal grain structure according to the invention. FIGS. 11A and 11B each show a method of forming thin films of a magnetic head according to an embodiment of the conventional technology. In the case of the conventional technology shown in FIG. 11A, thin films are formed by disposing a substrate 21 at a position opposite to the front of a sputtering target 22. In the case of the conventional technology shown in FIG. 11B, a substrate 21 is disposed so as to be inclined from the direction of a sputtering target 22, but thin films are formed while the substrate 21 is caused to rotate on its own axis, thereby rendering the directional property of the thin films uniform. Both are techniques for forming homogeneous thin films having no directional property on the substrate 21.

In contrast, with the method of forming the thin films for producing the inclined crystal grain structure according to the embodiment of the invention as shown in FIG. 11C, a substrate 21 is disposed so as to be inclined in relation to a sputtering target 22, and incident angles of raw material particles ejected from the sputtering target 22 are kept constant without rotating the substrate 21 on its axis. In order that respective thicknesses of the thin films formed on the substrate is kept constant as much as possible, the substrate may be revolved around the sputtering target. As a result, a crystal grain structure inclined by a predetermined angle can be obtained.

EMBODIMENT 4

Figure 12:
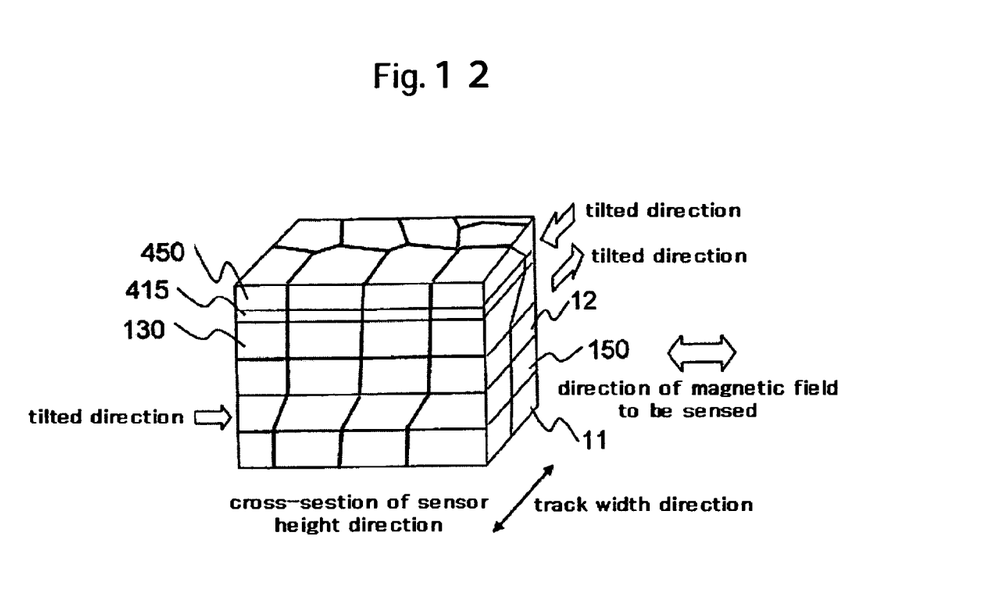
FIG. 12 is a view showing an example of the magneto-resistive multilayered construction wherein the inclined crystal grain structure is adopted in a soft magnetic free layer, ferromagnetic pinned layers and a single-domain forming ferromagnetic layer.

FIG. 12 is a view showing another construction example of the magneto-resistive multilayered construction adopting the inclined crystal grain structure according to another embodiment of the invention. An inclined crystal grain structure ferromagnetic pinned layer 150 preferably has a synthetic ferromagnet structure (not shown in the figure) multilayered with an antiparallel coupling layer. Further, an inclined crystal grain structure soft magnetic free layer 130, and an inclined crystal grain structure single-domain forming ferromagnetic layer 450 are stacked thereon. The inclined crystal grain structure soft magnetic free layer 130, and the inclined crystal grain structure single-domain forming ferromagnetic layer 450 are formed in respective shapes substantially identical in size in the direction of the width of tracks, having an end at an identical spot, forming a closed magnetic circuit structure to cancel out respective magnetizations thereof, thereby stabilizing magnetization alignment. As to directions of magnetic anisotropies due to the respective inclined crystal grain structures, that of the inclined crystal grain structure ferromagnetic pinned layer 150 is in parallel with the direction of a magnetic field to be detected while those of the inclined crystal grain structure soft magnetic free layer 130, and the inclined crystal grain structure single-domain forming ferromagnetic layer 450, respectively, are directions substantially orthogonal to the direction of the magnetic field to be detected. By so doing, a stable ferromagnetic pinned layer, and a soft magnetic free layer turned into a single domain can be implemented, thereby fabricating a magnetic head stable in output.

EMBODIMENT 5

Figure 13:
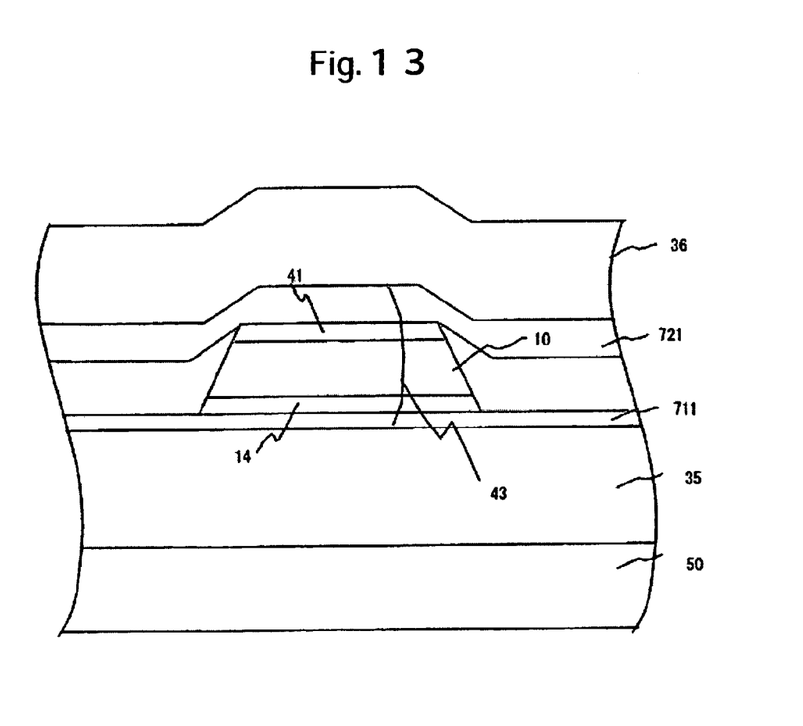
FIG. 13 is a conceptual view showing a construction example of a magneto-resistive magnetic read head.

FIG. 13 is a conceptual view of a magnetic read head mounting a magneto-resistive element wherein a multilayered construction according to an embodiment of the invention is adopted, as seen from a face thereof, opposite to a magnetic recording medium. A lower magnetic shield 35 doubling as an electrode, disposed over a substrate 50 doubling as a slider, a lower electroconductive gap 711, an electroconductive underlayer film 14, a magneto-resistive multilayered film 10, an electroconductive protective film 41, an upper electroconductive gap 721, and an upper magnetic shield 36 doubling as an electrode are formed.

Even if the electroconductive underlayer film 14 and the electroconductive protective film 41, shown in the figure, are omitted from a structure, such a structure does not depart from the spirit and scope of the invention. A read gap 43 is defined as a space between the upper magnetic shield 36 doubling as the electrode, and the lower magnetic shield 35 doubling as the electrode, and is formed by disposing the magneto-resistive multilayered film 10 therebetween.

EMBODIMENT 6

Figure 14:
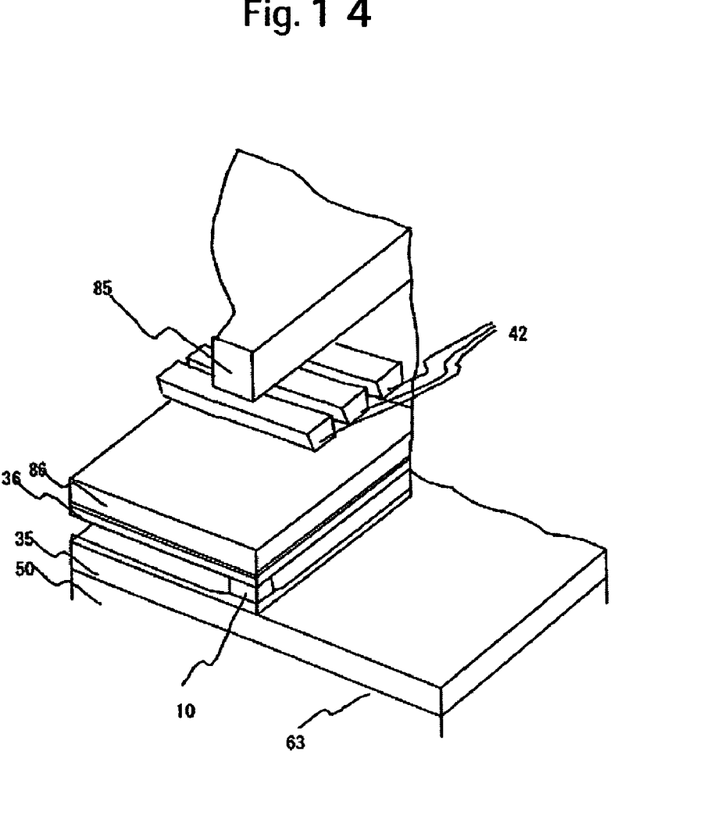
FIG. 14 is a conceptual view showing a construction example of a perpendicular recording read-write separation type magnetic head.

FIG. 14 is a conceptual view showing a perpendicular recording read-write separation type magnetic head with the magneto-resistive element according to an embodiment of the invention, mounted therein. The perpendicular recording read-write separation type magnetic head comprises a magneto-resistive multilayered film 10 formed over a substrate 50 doubling as a slider, a lower magnetic shield 35 doubling as an electrode, an upper magnetic shield 36 doubling as an electrode, an magnetic return pole 86, coils 42, and a main magnetic pole 85, having an air bearing surface 63 formed so as to face a recording medium. The magnetic head according the present invention is intended to enhance performance of a reproducing part, and represents a technology capable of coping with both the perpendicular recording and the conventional longitudinal recording. However, by combining this magnetic head with a perpendicular magnetic recording head, in particular, a more effective function can be implemented. In the case of the perpendicular magnetic recording, the magnitude of a magnetic field flowing from the magnetic recording medium into the magnetic head becomes about 1.5 times as large as that in the case of the conventional longitudinal recording. As shown in FIGS. 7 and 9, one of the advantageous effects of the present technology is to provide a sensor film with uniaxial anisotropy greater than that in the case of the conventional technology. Accordingly, with the use of the present technology, it is possible to implement a magnetic head provided with anisotropy greater than that in the conventional case so as not to be saturated against a large magnetic field from the perpendicular recording medium.

Figure 15:
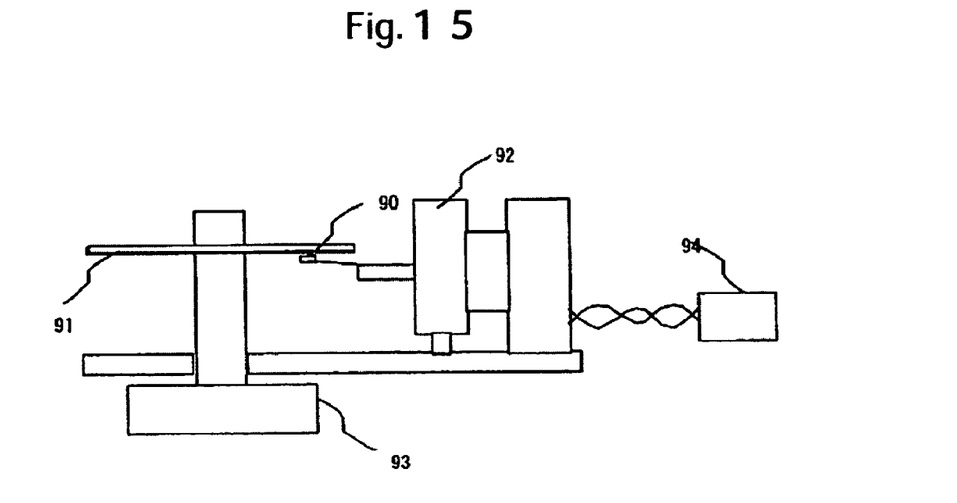
FIG. 15 is a schematic representation showing a construction example of a hard-disk drive.

FIG. 15 is a schematic representation showing a construction example of a hard-disk drive using the magnetic head according to the invention. A recording medium 91 for magnetically recording information, in a disk-like shape, is rotated by a spindle motor 93, and a head slider 90 is guided over tracks on a disk 91 by an actuator 92. More specifically, with the hard disk drive, a read head and a write head, formed on the head slider 90, approach predetermined recording positions on the recording medium 91 by virtue of this mechanism, thereby sequentially writing and reading signals. The actuator 92 is preferably a rotary actuator. Recording signals are recorded on the medium by the write head through the intermediary of a signal processing system 94, and output of the read head is obtained as signals through the intermediary of the signal processing system 94. Further, in causing the read head to be shifted over desired recording tracks, positions on the track are detected by use of highly sensitive output from the read head to thereby control the actuator, so that positioning of the head slider can be executed. In the figure, there are shown one piece each of the head slider 90 and the disk 91, however, a plurality of the head sliders and the disks, respectively, may be installed. Further, the recording medium 91 may be one on both the top and bottom surfaces of which information is recorded. In the case of recording the information on both the surfaces of the disk, the head slider 90 is disposed on both the surfaces of the disk.

Tests were conducted on the magnetic head according to the invention, and the hard-disk drive using the same, having the construction described, and results of the tests demonstrated sufficient output, and excellent bias characteristic, furthermore, reliability in operation being found excellent.

EMBODIMENT 7

Figure 16:
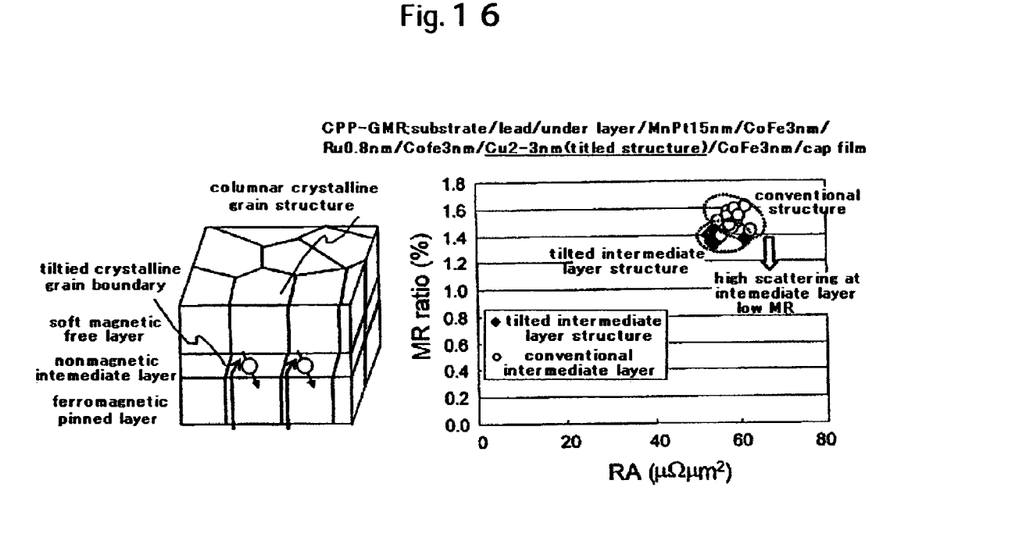
FIG. 16 is view showing a relationship between resistance-area-product RA and MR ratio with respect to CPP-GMR elements.

FIG. 16 is view showing a relationship between resistance-area-product RA and MR ratio with respect to CPP-GMR element in the cases of adopting the conventional structure, and the inclined crystal grain structure, respectively, in the nonmagnetic intermediate layer. While an increase in MR ratio was observed in the case of the structure according to the invention, adopting the inclined crystal grain structure in the soft magnetic free layer, as previously described in Embodiment 1, and FIGS. 1 and 4, it is evident from FIG. 16 that the MR ratio has decreased rather than increased as a result of adopting the inclined crystal grain structure. This can be understood due to a phenomenon illustrated in a conceptual view shown in the left-hand part in FIG. 16. With the adoption of the inclined crystal grain structure, the scatter probability of the electrons increases as described in Embodiment 1. In the case where the inclined crystal grain structure is adopted in the nonmagnetic intermediate layer as in FIG. 16, electrons passing through the nonmagnetic intermediate layer in the direction of thickness thereof undergo scatter due to the effect of the inclined crystal grain structure; however, this region being nonmagnetic, such scatter of the electrons is not dependent on the electron spin. As a result, increase in scattering of the electrons, taking place due to the inclined crystal grain structure, not only makes no contribution at all to the magnetoresistance, but also has a function of rather lowering transmissivity of the electrons transmitting between the ferromagnetic pinned layer and the soft magnetic free layer. Accordingly, there occurs an undesirable effect of lowering the MR ratio. For this reason, with the present invention, a region where the inclined crystal grain structure is to be adopted is not the nonmagnetic intermediate layer, but regions other than that, such as the ferromagnetic pinned layer, the soft magnetic free layer, and so forth, are preferable parts.

EMBODIMENT 8

Figure 17:
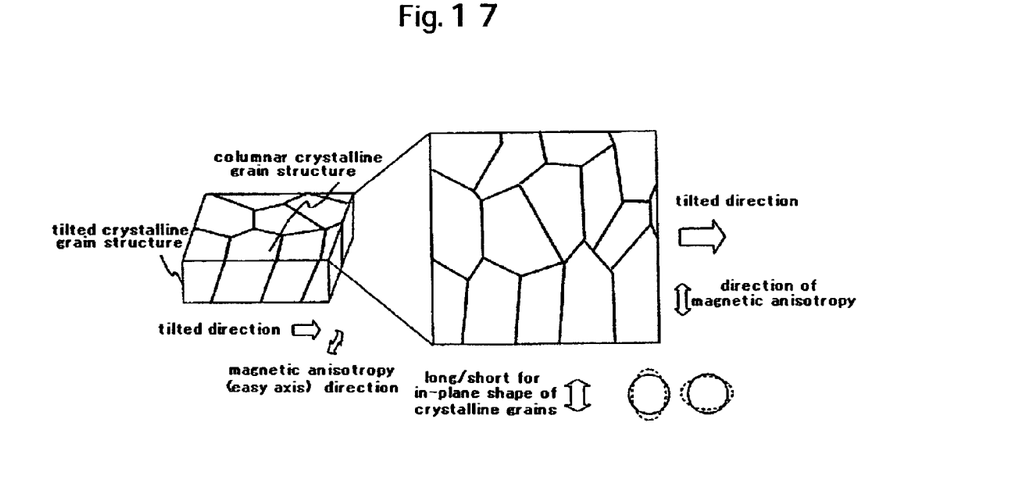
FIG. 17 is a conceptual view showing an in-plane crystal grain structure of a film adopting the inclined crystal grain structure according to another embodiment of the invention.

FIG. 17 is a view showing an example of an in-plane crystal texture structure in the case of producing the inclined crystal grain structure according to the invention. As a result of producing the inclined crystal grain structure, the in-plane crystal texture structure as well undergoes a change. Anisotropy in relation to the in-plane direction occurs particularly to the shapes of crystal grains. The in-plane shapes of crystal grains have no directional property in general, however, upon the formation of the inclined crystal grain structure according the present invention, there is obtained an anisotropic texture with the in-plane shapes of the crystal grains, either longer or shorter in the direction of inclination as in the case of the example shown in FIG. 17. The formation of the texture is regarded effective for occurrence of magnetic anisotropy. It is presumed that such anisotropy of the in-plane shapes of the crystal grains appears as grain size dependency on direction, anisotropy of the directional property of a grain boundary shared by the crystal grains adjacent to each other, and so forth.

EMBODIMENT 9

Figure 18:
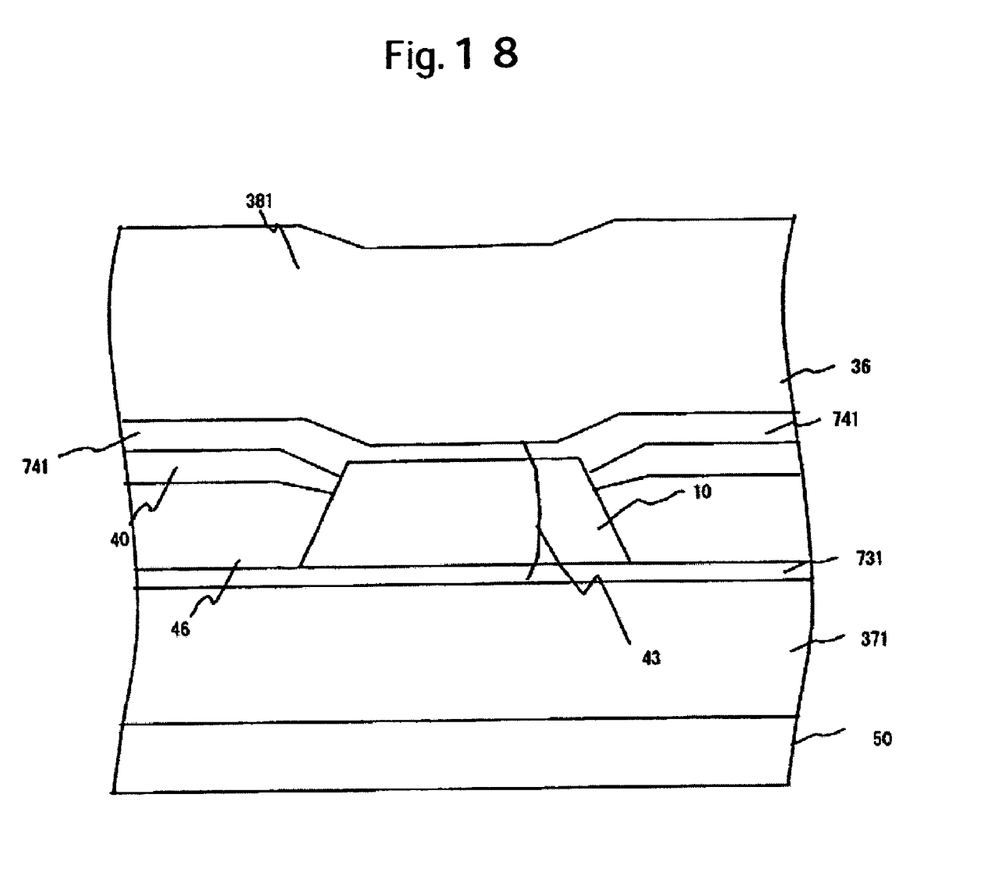
FIG. 18 is a view showing a construction example of a in-plane current type (CIP) magneto-resistive head adopting the inclined crystal grain structure according to another embodiment of the invention.

FIG. 18 is a view showing a construction example of a longitudinal current type (CIP) magneto-resistive head adopting the inclined crystal grain structure according to an embodiment of the invention, as seen from a face thereof, opposite to a magnetic recording medium. The CIP magneto-resistive head, formed over a substrate 50 doubling as a slider, comprises a lower magnetic shield 371, a lower insulation gap 731, a magneto-resistive multilayered film 10, a high coercive force bias film 46 and an electrode 40, disposed at both ends of the magneto-resistive multilayered film 10, an upper insulation gap 741, and an upper magnetic shield 381. Herein, a domain control structure, that is, the so-called hard bias, is cited by way of example; however, it is to be pointed out that other domain control structures do not depart from the spirit and scope of the invention. A read gap 43 is defined as a space between the upper magnetic shield 381 and the lower magnetic shield 371, and is formed by disposing the magneto-resistive multilayered film 10 therebetween.

The construction of a multilayered body using the inclined crystal grain structure according to the invention can be applied to a magnetic sensor and a magnetic head, using the perpendicular current type magnetoresistance, the so-called CPP-GMR and tunnel magnetoresistive heads; however, besides those described, the same also can be utilized for a magnetic sensor, and a magnetic head, using the CIP (the longitudinal current type)-GMR (giant magnetoresistance). This is so because magnetic shape anisotropy due to the effect of the inclined crystal grain structure can be similarly utilized for those sensors. The magneto-resistive multilayered film 10 is made up of multilayered films having the inclined crystal grain structure at localized parts thereof, and is capable of implementing high stability, and reinforcing the operation of the soft magnetic free layer, and the bonding force of the ferromagnetic pinned layer.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic head comprising:
 a multilayered film, formed over a substrate, including a first ferromagnetic layer/a nonmagnetic intermediate layer/a second ferromagnetic layer; and
 a pair of electrodes sandwiching the multilayered film in the direction of thickness of the multilayered film, wherein crystal grains in at least one of the layers of the multilayered film are inclined in a predetermined direction in relation to the direction of the normal to the substrate.

2. A magnetic head according to claim 1, wherein the multilayered film has a spin valve multilayered construction of a ferromagnetic pinned layer/a nonmagnetic intermediate layer/a soft magnetic free layer, and a magnetization direction of the ferromagnetic pinned layer is in effect fixed against a magnetic field to be detected by an antiferromagnetic film or a hard magnetic film.

3. A magnetic head according to claim 2, wherein crystal grains in the ferromagnetic pinned layer are inclined in the predetermined direction in relation to the direction of the normal to the substrate.

4. A magnetic head according to claim 2, wherein crystal grains in the ferromagnetic pinned layer are inclined in a first direction in relation to the direction of the normal to the substrate, and crystal grains in the soft magnetic free layer are inclined in a second direction substantially orthogonal to the first direction, in the in plane direction of the substrate.

5. A magnetic head according to claim 1, wherein crystal grains in the nonmagnetic intermediate layer are substantially parallel with the direction of the normal to the substrate.

6. A magnetic head according to claim 1, wherein an angle of the inclination is in a range of 20° to 80°.

7. A magnetic head according to claim 1, wherein the inclined crystal grains have a crystal structure or texture structure, anisotropic in the in-plane direction of the substrate.

8. A magnetic head according to claim 1, wherein a grain size has anisotropy between the direction of inclination, projected in the in-plane direction of the substrate, by the inclined crystal grains, and a directional orthogonal thereto, in the in-plane direction.

9. A magnetic head according to claim 1, wherein-shapes of the crystal grains has anisotropy between the direction of inclination, projected in the in-plane direction of the substrate, by the inclined crystal grains, and a direction orthogonal thereto, in the in-plane direction.

* * * * *